US007980796B1

(12) United States Patent  
Salt

(10) Patent No.: US 7,980,796 B1  
(45) Date of Patent: Jul. 19, 2011

(54) MECHANICAL LOCK STOP SYSTEM AND METHOD

(75) Inventor: Kevin L. Salt, Mt. Vernon, WA (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 12/434,219

(22) Filed: May 1, 2009

(51) Int. Cl.  
B61D 3/16 (2006.01)

(52) U.S. Cl. .......................... 410/77; 410/43

(58) Field of Classification Search .............. 410/43, 410/32, 81, 82, 44, 2, 80, 92, 105, 85, 100, 410/78; 414/480; 244/118.1, 137.1; B61D 3/16  
See application file for complete search history.

(56) References Cited

U.S. PATENT DOCUMENTS

| 3,003,567 | A | * | 10/1961 | Flaugh et al. ................ 416/46 |
| 5,356,249 | A | * | 10/1994 | Hove ............................ 410/83 |
| 5,397,078 | A | * | 3/1995 | Eilenstein-Wiegmann et al. ........................ 244/118.1 |
| 5,960,674 | A | | 10/1999 | Brockmeyer |
| 6,039,519 | A | * | 3/2000 | Jones et al. ................... 410/69 |
| 2006/0104740 | A1 | * | 5/2006 | Girardin et al. ............. 410/105 |

* cited by examiner

Primary Examiner — Glenn Dayoan  
Assistant Examiner — Sunsurraye Westbrook

(57) ABSTRACT

The disclosure provides for a lock stop system and method. In one embodiment there is provided a mechanical lock stop system for locking and controlled movement of a load. The system comprises a modular extruded part having a plurality of spaced openings on at least one side of the modular extruded part. The system further comprises a lock stop apparatus comprising a linear bearing having at least two sides, wherein the modular extruded part moves through the linear bearing; a release element having an attached hinge; a locking element having a first end and a second end; and a compression spring mounted around at least a portion of the locking element. The release element locks and unlocks the first end of the locking element to the modular extruded part.

20 Claims, 18 Drawing Sheets

MECHANICAL LOCK STOP SYSTEM AND METHOD

BACKGROUND

1) Field of the Disclosure

The disclosure relates to mechanical lock stop systems. In particular, the disclosure relates to a mechanical lock stop system and method for stopping the motion of a load on a device on which the system is installed.

2) Description of Related Art

In assembling aircraft, spacecraft, vehicles, buildings, and other objects, it is often necessary to move and install loads, such as heavy and lighter weight rigid barrier panels, for use in such assembly. Such loads may be moved and installed manually. However, such manual moving and installation lacks ease of use and can result in loss of control and decreased safety if an operator lets go of the load for any reason. In addition, loads such as a rigid barrier panel may be placed at a sloped position on a movable mechanical articulating device, such as a device having wheels, and moved to a desired location, and once the desired location is reached, the rigid barrier panel may be articulated along an extruded part from the sloped position to a vertical position. However, when the rigid barrier panel moves along the extruded part from a sloped position to a vertical position or vice versa, there is the possibility that the rigid barrier panel may slip or fall, thus resulting in loss of control. Known friction locks may be used to hold the rigid barrier panel in place along the extruded part. Such friction locks require twisting a handle which tightens up a bolt in a groove of the extruded part. However, if there is a slip of any kind which causes the rigid barrier panel to be released, loss of control results which can make it difficult or impossible for an operator to reach up and twist the handle to lock the rigid barrier panel back in place Moreover, known friction locks lack ease of use due to the need to manually tighten the lock handle to adjust the friction. If the friction is not adjusted tightly enough, unwanted movement of the rigid barrier panel can occur. Also, known friction locks are not positive mechanical locks and may be overridden. If the operator lets go for any reason, the friction lock will not lock automatically.

Accordingly, there is a need for a mechanical lock stop system and method that provides advantages over known systems and methods.

SUMMARY

This need for a mechanical lock stop system and method that provides advantages over known systems and methods is satisfied. Unlike known systems and methods, embodiments of the mechanical lock stop system and method of the disclosure may provide one or more of the following advantages: provides a mechanical lock stop system and method that locks and positions a load in place on a device such as a movable mechanical articulating device; provides a mechanical lock stop system and method that stops and locks a load in place automatically if such load slips for any reason and creates a solid positive mechanical lock wherever an operator deems necessary; provides a mechanical lock stop system and method that may be used for any application that requires moving equipment that moves on a linear bearing and an extruded part that has pressure or weight against it and that requires a safety lock or position lock; provides a mechanical lock stop system and method that in the event of an accidental loss of control of the load is stopped and locked in the closest increment or periodic location on the length of a modular extruded part, thus increasing the safety of the lock stop system; provides a mechanical lock stop system and method that is easy to use and does not require manual tightening of a lock; provides a mechanical lock stop system and method that is simple and economical to assemble; provides a mechanical lock stop system and method that is ergonomically advantageous by making the load easier to lift, easier to control, and easier to lock in place, and no longer requires the load to be lifted in free space which can result in loss of control; provides a mechanical lock stop system and method that stops the linear motion of the device on which it is installed and allows an operator to release a linear bearing for normal movement by means of depressing a push release element; and, provides a mechanical lock stop system and method for locking a load in place such as a load used to assemble aircraft, spacecraft, vehicles, buildings, and other suitable objects.

In an embodiment of the disclosure, there is provided a mechanical lock stop system for locking and controlled movement of a load. The system comprises a modular extruded part having a plurality of spaced openings on at least one side of the modular extruded part. The system further comprises a lock stop apparatus comprising a linear bearing having at least two sides, wherein the modular extruded part moves through the linear bearing. The lock stop apparatus further comprises a release element having an attached hinge. The lock stop apparatus further comprises a locking element having a first end and a second end. The lock stop apparatus further comprises a compression spring mounted around at least a portion of the locking element. The release element locks and unlocks the first end of the locking element to the modular extruded part.

In another embodiment of the disclosure, there is provided a mechanical lock stop system for locking and controlled movement of a load positioned on a movable mechanical articulating device. The system comprises a modular T-slot extrusion having a plurality of round equidistantly spaced openings on at least one side of the modular T-slot extrusion. The system further comprises a lock stop apparatus comprising a linear bearing having at least two sides, wherein the modular T-slot extrusion moves through the linear bearing. The lock stop apparatus further comprises one or more mounting elements attached to the linear bearing. The lock stop apparatus further comprises a palm paddle having an attached hinge. The lock stop apparatus further comprises a shoulder bolt having a first end and a second end, wherein the first end slip fits into each of the spaced openings. The lock stop apparatus further comprises a compression spring mounted around at least a portion of the shoulder bolt. The lock stop apparatus further comprises a bushing element inserted into the first side of the linear bearing, wherein the bushing element has an opening for insertion of the second end of the shoulder bolt. The lock stop apparatus further comprises a spacer assembly coupled between the palm paddle and the linear bearing. The palm paddle can be released to engage the first end of the shoulder bolt with one of the plurality of spaced openings on the modular T-slot extrusion, and the palm paddle can be depressed to disengage the first end of the shoulder bolt from one of the plurality of spaced openings on the modular T-slot extrusion.

In another embodiment of the disclosure, there is provided a method for locking and controlling movement of a load adjacent a modular extruded part. The method comprises mounting a lock stop apparatus onto a modular extruded part having a plurality of spaced openings on at least one side of the modular extruded part. The lock stop apparatus comprises a linear bearing having at least two sides, wherein the modular extruded part moves through the linear bearing. The lock stop apparatus further comprises a release element having an attached hinge. The lock stop apparatus further comprises a locking element having a first end and a second end. The lock stop apparatus further comprises a compression spring mounted around at least a portion of the locking element. The method further comprises positioning a load at a first position wherein the load is adjacent the modular extruded part. The method further comprises releasing the lock stop apparatus by depressing the release element so that the first end of the locking element disengages from one of the spaced openings on the modular extruded part. The method further comprises moving the modular extruded part through the linear bearing one or more times until the first end of the locking element engages a next desired spaced opening so that the load moves from the first position to a final position. The method further comprises locking the modular extruded part to the lock stop apparatus one or more times by releasing the release element so that the first end of the locking element engages the next desired spaced opening, wherein the one or more times of moving the modular extruded part corresponds to the one or more times of locking the modular extruded part to the lock stop apparatus.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The disclosure provides for embodiments of a mechanical lock stop system and method. The mechanical lock stop system and method may be used for locking a load in place such as a load used to assemble aircraft, spacecraft, vehicles, buildings, and other suitable objects. Accordingly, one of ordinary skill in the art will recognize and appreciate that the system and method of the disclosure can be used in any number of applications involving locking loads in place such as loads used to assemble aircraft, spacecraft, vehicles, buildings, and other suitable objects.

Figure 1:
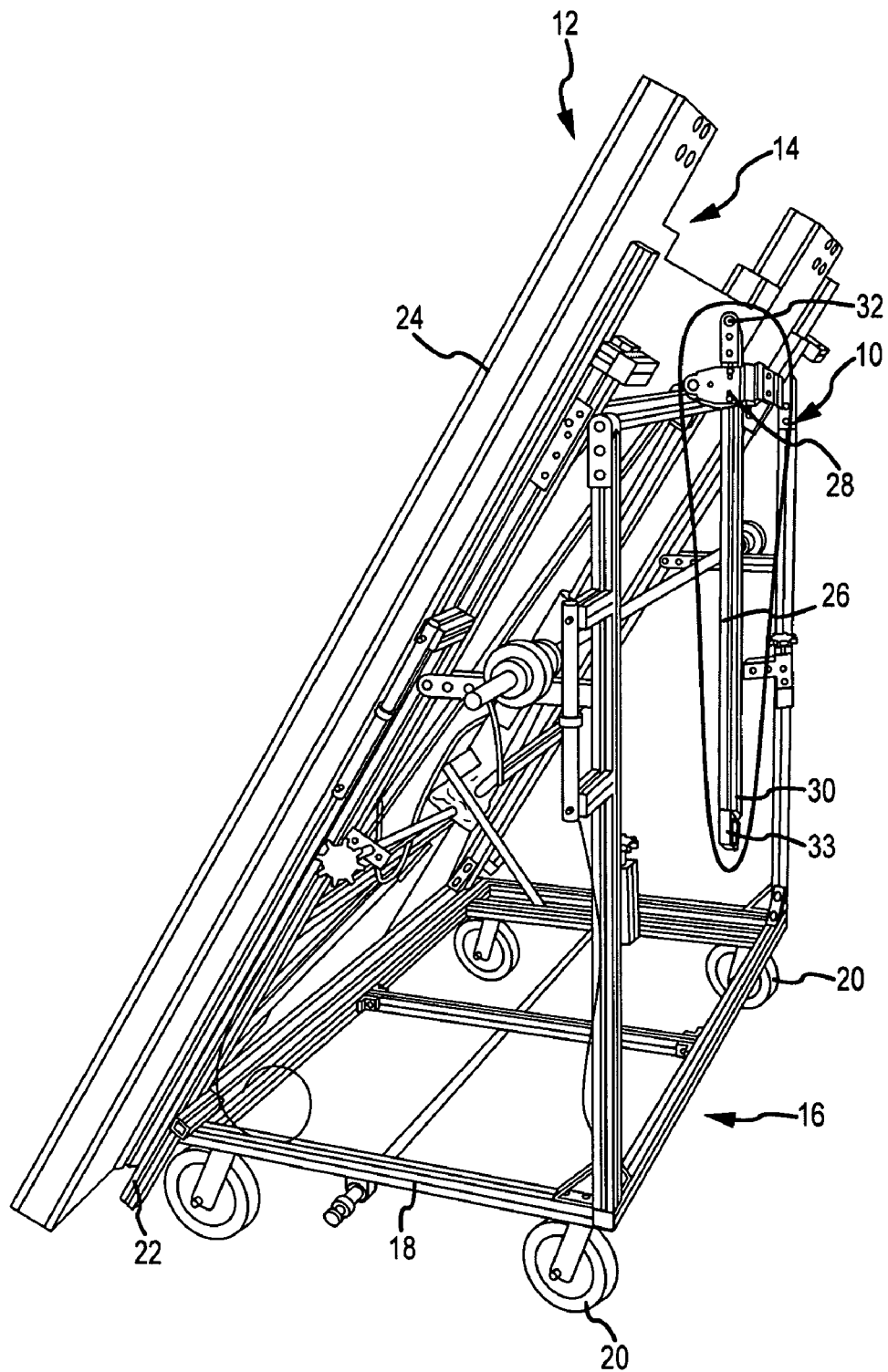
FIG. 1 is an illustration of a mechanical lock stop system of one of the embodiments of the disclosure in use with a load in a first position.

Referring more particularly to the drawings, FIG. 1 is an illustration of a mechanical lock stop system 10 of one of the embodiments of the disclosure in use with a load 12 where the load is positioned at a first position 14 where the first position is sloped, such as at a 30 degree angle. The mechanical lock stop system 10 may be attached to or installed on an exemplary tool 16 such as a movable mechanical articulating device 18 having wheels 20 and a sloped carriage 22. The movable mechanical articulating device 18 may comprise a rigid barrier move tool or another suitable device. The load 12 is preferably initially in a sloped position on the tool 16, such as the movable mechanical articulating device 18, and coupled to the mechanical lock stop system 10. Alternatively, the load 12 may initially be in a vertically upright position and may be moved to a sloped position. The load 12 may comprise a heavy, medium weight, or lightweight load. For example, the load may comprises a rigid barrier panel 24. An exemplary rigid barrier panel may be approximately 7 feet by 7 feet square and weigh about 200 pounds. However, the rigid barrier panel may also be of another suitable dimension and weight. The load may also comprise access or protective doors, wall panels, and other suitable loads. The mechanical lock stop system 10 provides for locking, braking, and controlled movement of the load 12 positioned on the movable mechanical articulating device 18. The mechanical lock stop system 10 may be used to hold the rigid barrier panel 24 in place when it is being installed because that is when the rigid barrier panel 24 has to be articulated up to a vertical position. However, the mechanical lock stop system 10 may be used with any object that needs to be moved to an upright position and with any moving equipment that moves on a linear bearing that has pressure against it or weight against it and that requires a solid lock.

Figure 14:
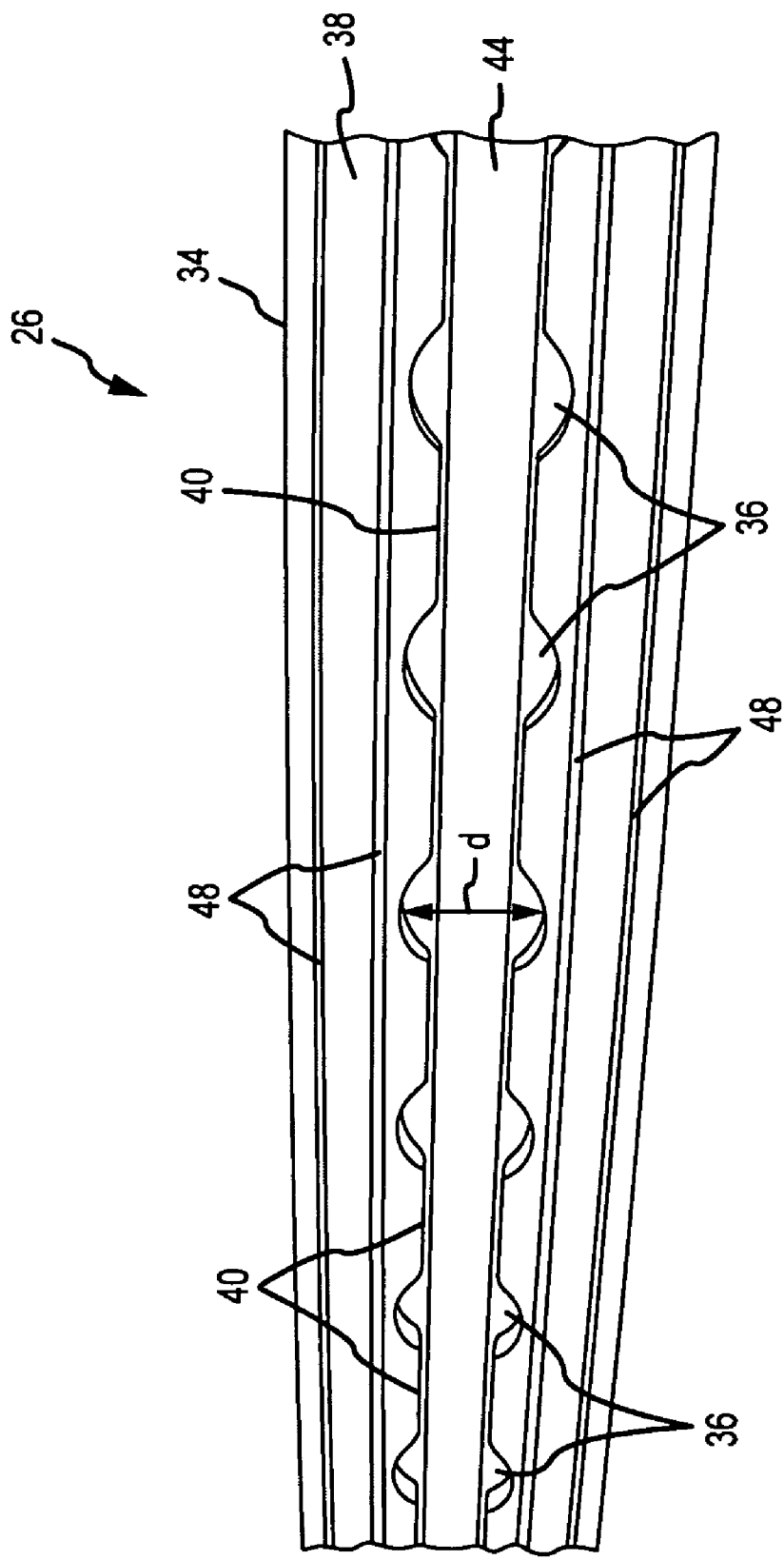
FIG. 14 is an illustration of one of the embodiments of the modular extruded part used with embodiments of the lock stop apparatus of the disclosure.
Figure 15:
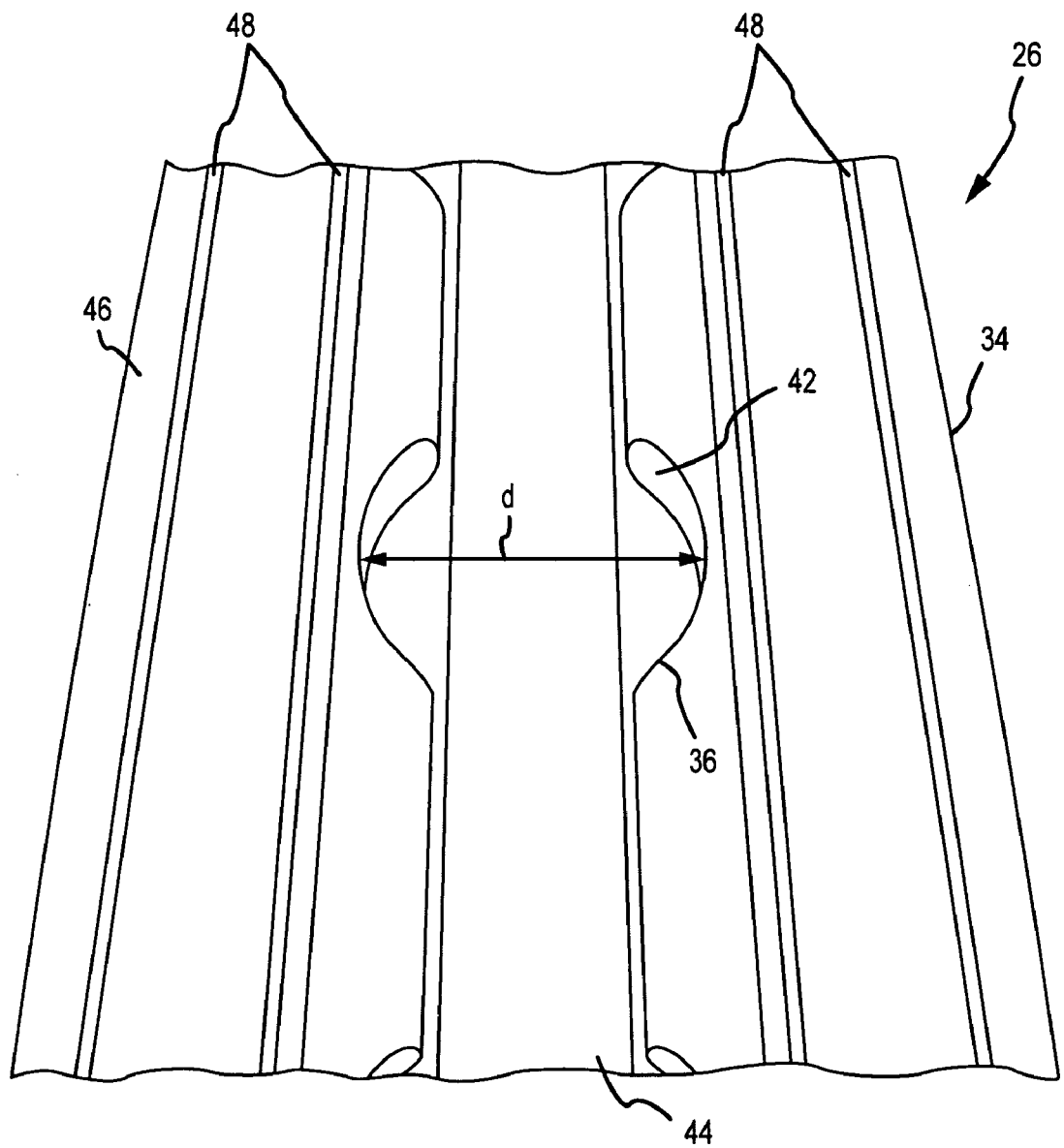
FIG. 15 is an illustration of a close-up view of a spaced opening of the modular extruded part of FIG. 14.

The mechanical lock stop system 10 comprises in one embodiment a modular extruded part 26 and a lock stop apparatus 28. As shown in FIG. 1, the modular extruded part 26 is preferably elongated and has a first end 30 and a second end 32. The first end 30 may have a handle 33 that can be grasped by an operator (not shown) to move or rotate the modular extruded part 26 up and down. The second end 32 is adjacent the rigid barrier panel 24. The modular extruded part 26 may be comprised of steel, aluminum, or any strong alloy or composite material. Preferably, the modular extruded part 26 is a modular T-slot extrusion 34 or extruded part (see FIGS. 14-15). The modular extruded part 26 may also comprise another suitable extrusion. As shown in FIGS. 14-15, the modular extruded part 26 in the form of a modular T-slot extrusion 34 has a plurality of spaced openings 36 on at least one side 38 of the modular extruded part 26. FIG. 14 is an illustration of one of the embodiments of the modular extruded part 26 in the form of the modular T-slot extrusion 34 used with embodiments of the lock stop apparatus 28 of the disclosure. FIG. 15 is an illustration of a close-up view of the spaced opening 36 of the modular extruded part 26 of FIG. 14. The plurality of spaced openings 36 may be machined into the modular extruded part 26 and act to stop the load 12 from slipping with the lock stop apparatus 28. As shown in FIGS. 14-15, the plurality of spaced openings 36 are preferably spaced equidistantly from each other at regular intervals 40 such as about one inch intervals. However, the plurality of spaced openings 36 may be spaced at a little less than one inch intervals or greater than one inch intervals as well. In addition, the spaced openings 36 may also be spaced non-equidistantly from each other. The plurality of spaced openings 36 preferably comprise round openings 42 machined into at least one side 38 of the modular extruded part 26. However, the spaced openings may comprise square openings or other suitably shaped openings. Each of the spaced openings 36 has a suitable thickness, and each of the spaced openings 36 has an outer diameter (d) of a suitable length. The number of spaced openings 36 depends on the length of the modular extruded part 26 used. The modular extruded part 26 may have a central T-slot portion 44 that extends longitudinally below and centrally through the spaced openings 36. The modular extruded part 26 may have a first surface 46 having one or more longitudinally extending grooves 48. In another embodiment (not shown) of the modular extruded part, the plurality of spaced openings may be machined on two sides of the modular extruded part so that the modular extruded part may be used with two lock stop apparatuses to provide a double locking system. In another embodiment (not shown) of the modular extruded part, the plurality of spaced openings may be machined on three sides of the modular extruded part so that the modular extruded part may be used with three lock stop apparatuses to provide a triple locking system. The mechanical lock stop system 10 creates a mechanical lock at periodic locations along the length of the modular extruded part 26.

Figure 2:
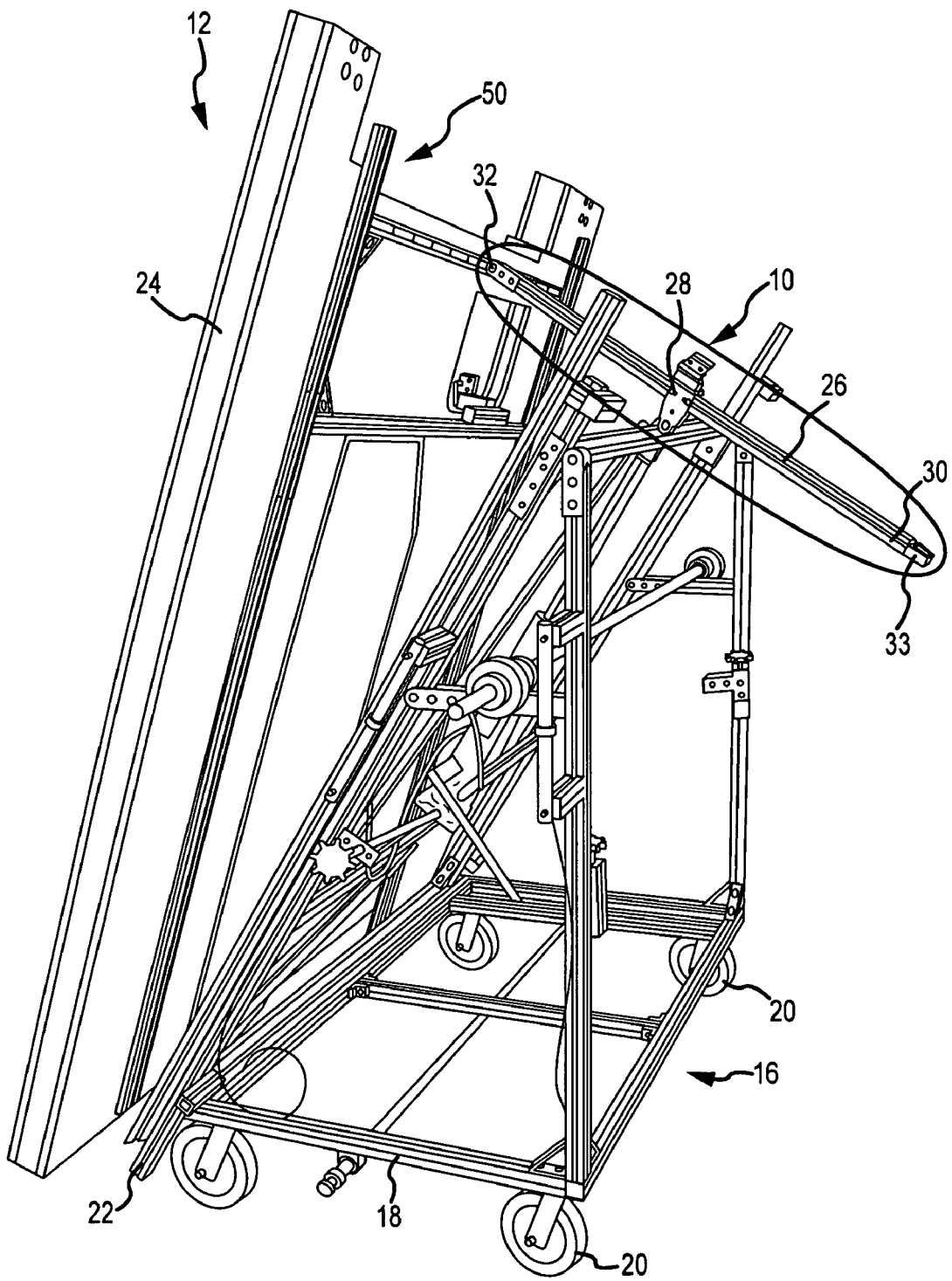
FIG. 2 is an illustration of the mechanical lock stop system of FIG. 1 in use with a load in a second position.
Figure 3:
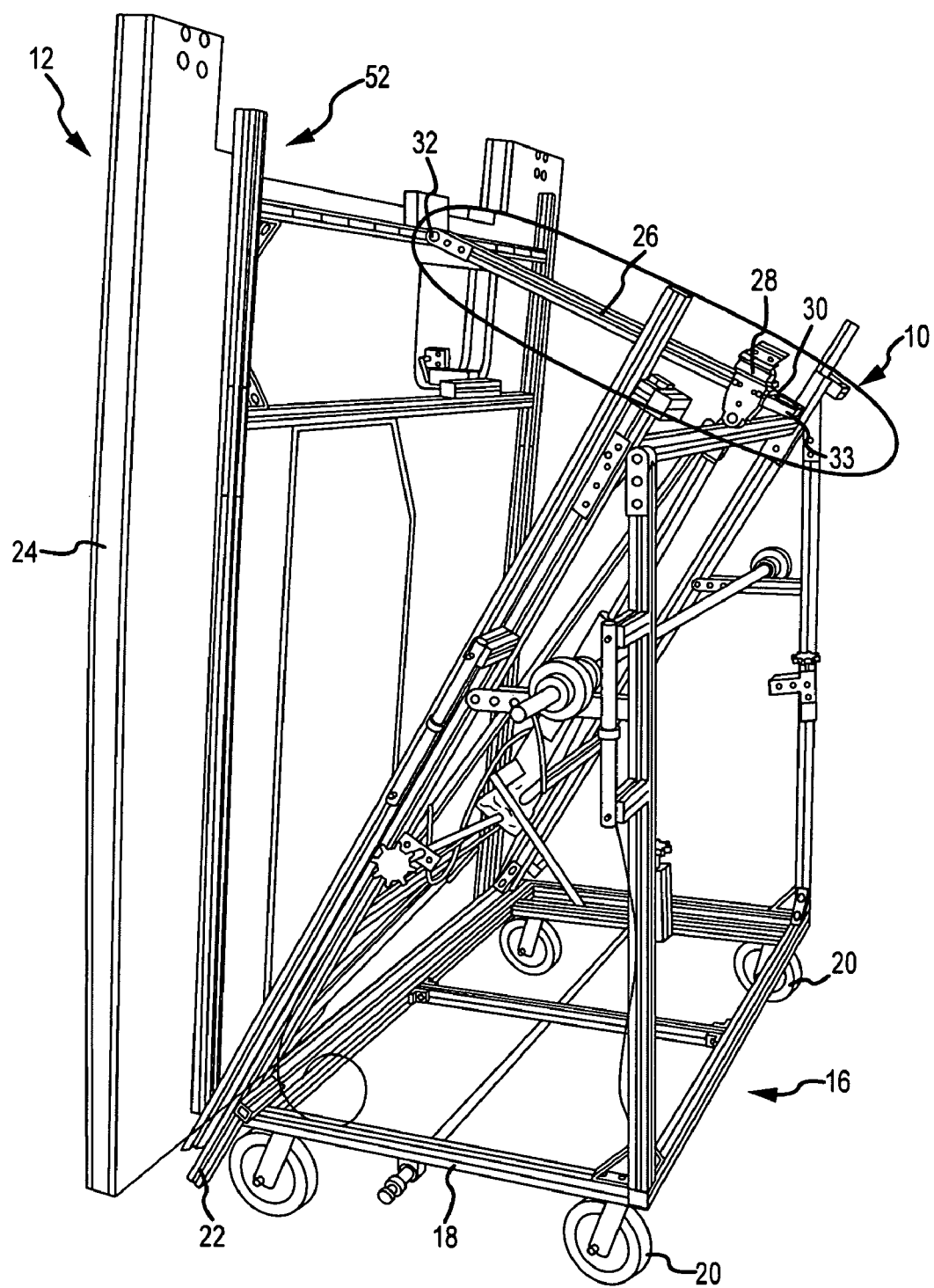
FIG. 3 is an illustration of the mechanical lock stop system of FIG. 1 in use with a load in a final position.

FIG. 2 is an illustration of the mechanical lock stop system 10 of FIG. 1 in use with the load 12 where the load 12 is positioned at a second position 50 where the second position is sloped, such as at a 15 degree angle. FIG. 3 is an illustration of the mechanical lock stop system 10 of FIG. 1 in use with the load 12 where the load 12 is positioned at a final position 52 where the final position is vertically upright, such as at a 90 degree angle. As the load is rotated from the first position 14 to the final position 52, if there is any slip or fall or any reason to stop at a particular point, the mechanical lock stop system 10 locks the load 12 into place rather than letting the load 12 fall back.

Figure 4:
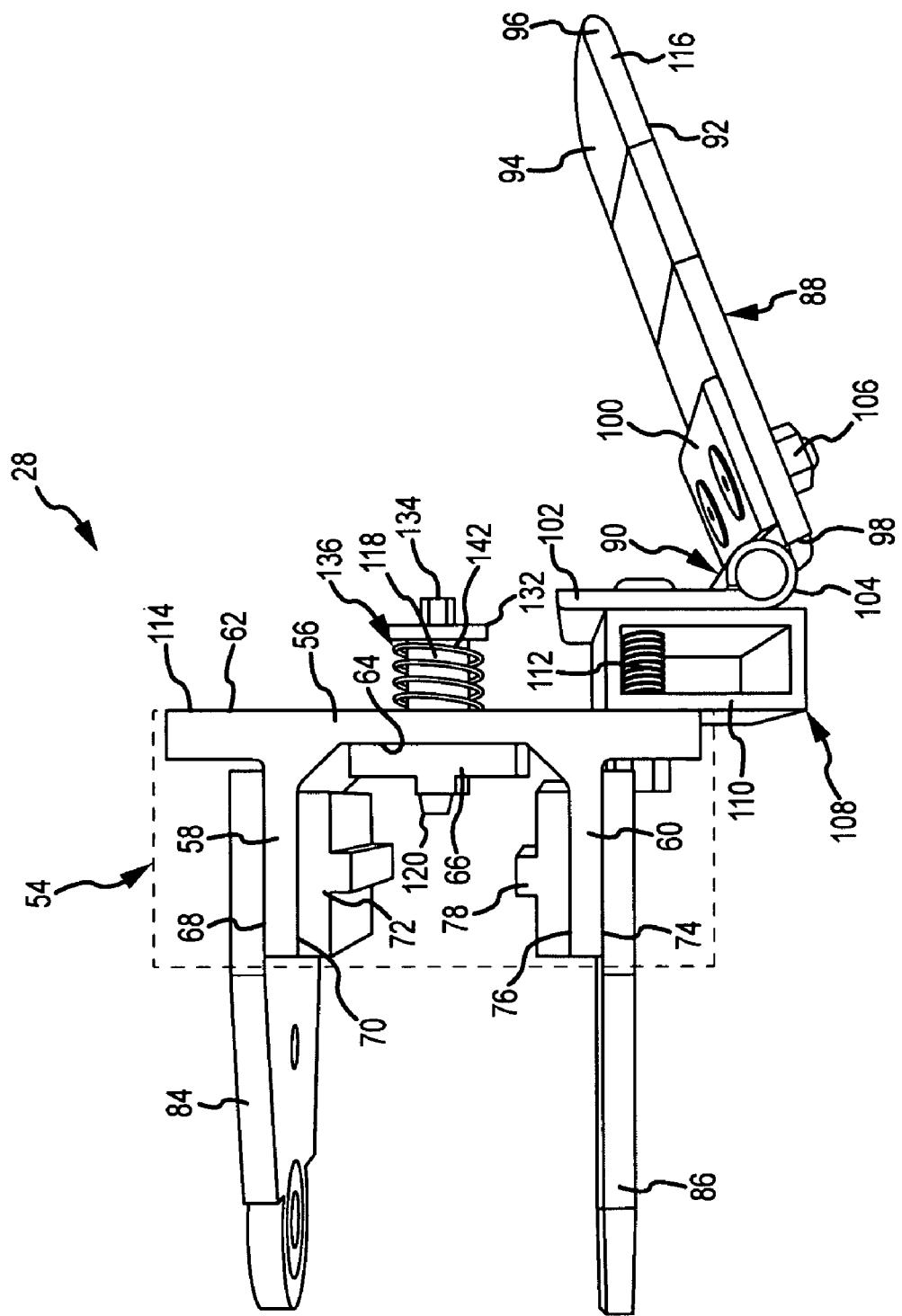
FIG. 4 is an illustration of a front view of a lock stop apparatus of one of the embodiments of the disclosure.
Figure 5:
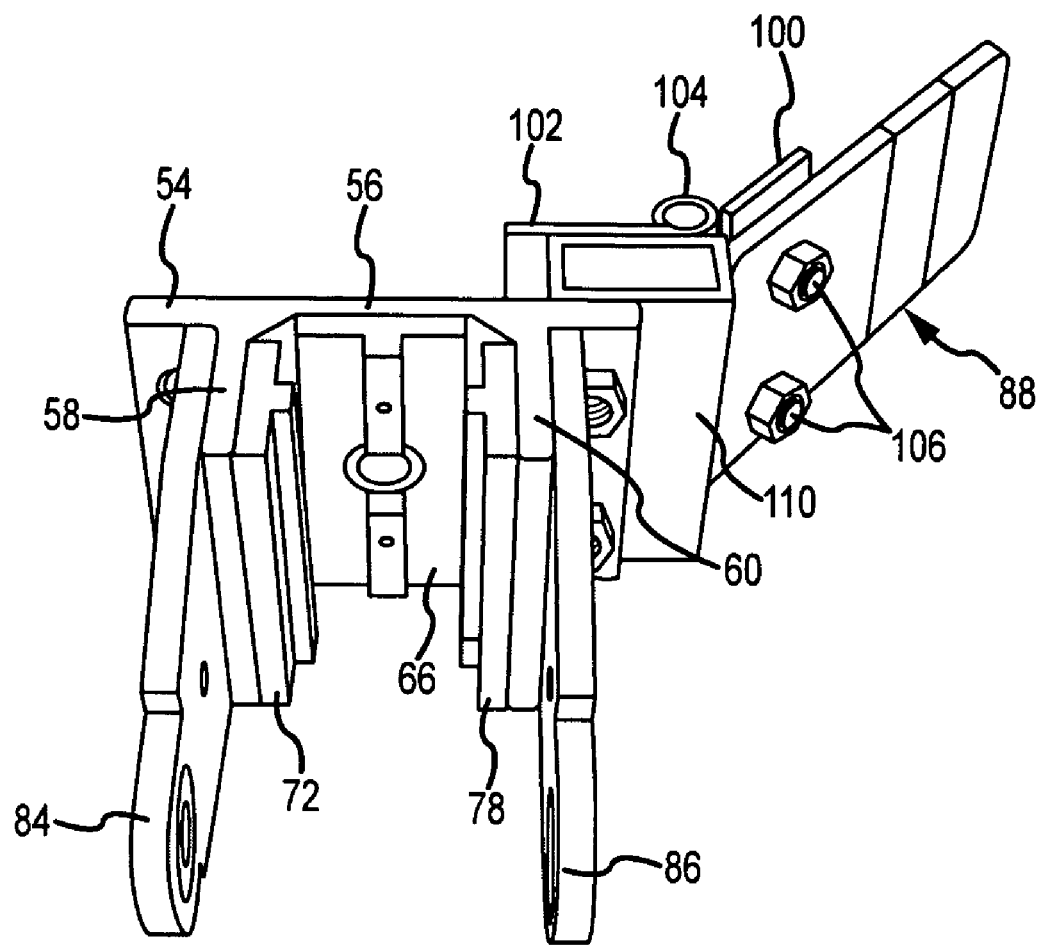
FIG. 5 is an illustration of a bottom perspective view of the lock stop apparatus of FIG. 4.
Figure 6:
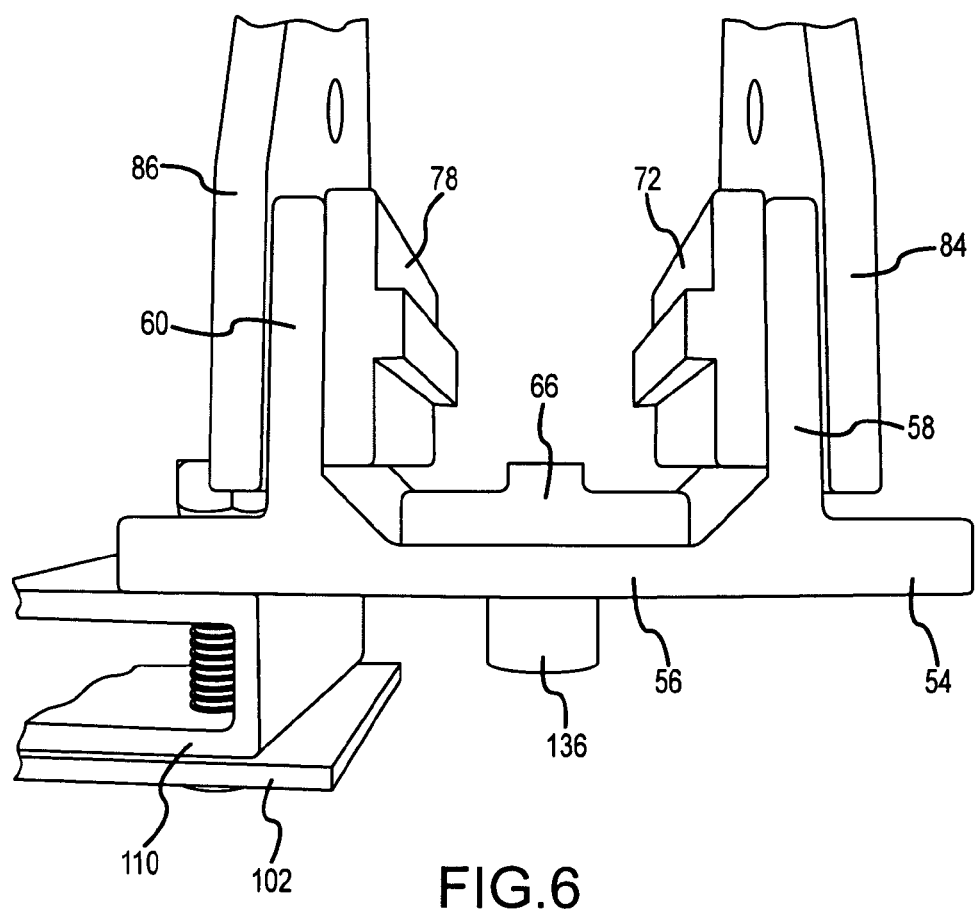
FIG. 6 is an illustration of a close-up front view of the linear bearing of FIG. 4.
Figure 7:
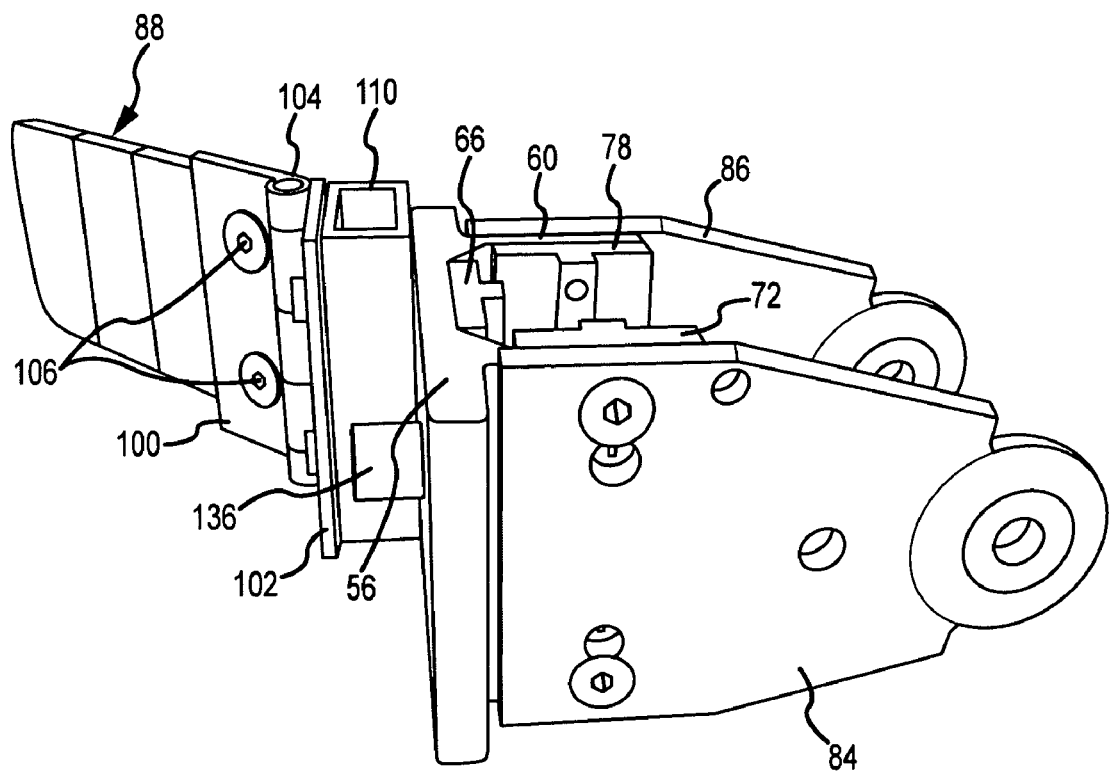
FIG. 7 is an illustration of a right side view of the lock stop apparatus of FIG. 4.

FIG. 4 is an illustration of a front view of a lock stop apparatus 28 of one of the embodiments of the disclosure. FIG. 5 is an illustration of a bottom perspective view of the lock stop apparatus 28 of FIG. 4. FIG. 7 is an illustration of a right side view of the lock stop apparatus 28 of FIG. 4. The lock stop apparatus 28 may comprise a linear bearing 54 having at least two sides for stability. Preferably, the lock stop apparatus 28 comprises three sides, including a first side 56, a second side 58, and a third side 60. However, in another embodiment the linear bearing 54 may have four sides. FIG. 6 is an illustration of a close-up front view of the linear bearing 54 of FIG. 4. The first side 56 has an exterior surface 62 and an interior surface 64. The linear bearing 54 may have a first glide element 66 attached to the interior surface 64. The first glide element 66 may have a T-shape or another suitable shape. The second side 58 has an exterior surface 68 and an interior surface 70. The linear bearing 54 may have a second glide element 72 attached to the interior surface 70. The second glide element 72 may have a T-shape or another suitable shape. The third side 60 has an exterior surface 74 and an interior surface 76. The linear bearing 54 may have a third glide element 78 attached to the interior surface 76. The third glide element 78 may have a T-shape or another suitable shape. The sides 56, 58, 60 of the linear bearing 54 may comprise aluminum, steel, any other strong metal or composite, or another suitable material. The glide elements 66, 72, 78 may be comprised of nylon, polytetrafluoroethylene, any strong natural or synthetic material that reduces friction, or another suitable material. The modular extruded part 26, such as the modular T-slot extrusion 34 (see FIG. 13), preferably moves through the linear bearing 54. The first glide element 66 may be aligned with the central T-slot portion 44 (see FIG. 13) of the modular extruded part 26 in the form of the modular T-slot extrusion 34. The second glide element 72 may be aligned with a first side T-slot portion 80 (see FIG. 12) of the modular extruded part 26 in the form of the modular T-slot extrusion 34. The third glide element 72 may be aligned with a second side T-slot portion 82 (see FIG. 10) of the modular extruded part 26 in the form of the modular T-slot extrusion 34. The linear bearing 54 may further comprise one or more pre-drilled holes 83 (see FIGS. 12-13) in the linear bearing 54 for insertion of additional hardware such as screws to aid in installation or attachment of the lock stop apparatus 28 onto the tool 16. As shown in FIG. 4, a first mounting element 84 may be attached to the exterior surface 68 of the second side 58 of the linear bearing 54. A second mounting element 86 may be attached to the exterior surface 74 of the third side 60 of the linear bearing 54. The mounting elements 84, 86 are optional and may be attached to provide additional mounting strength to the linear bearing 54. The mounting elements 84, 86 may be comprised of steel, aluminum, any strong metal or alloy, or another suitable material.

As shown in FIG. 4, the lock stop apparatus 28 further comprises a release element 88 having an attached hinge 90. The release element 88 has a first side 92, a second side 94, a first end 96, and a second end 98. The hinge 90 has a first side portion 100, a second side portion 102, and a central portion 104. The first side portion 100 of the hinge 90 may be attached to the second side 94 of the release element 88 with one or more attachment elements 106, such as one or more nuts and bolts or other suitable attachment elements. The second side portion 102 of the hinge 90 may be attached to a spacer assembly 108. The spacer assembly 108 may be coupled between the release element 88 and the linear bearing 54. The spacer assembly 108 may comprise a spacer 110 and a spacer attachment 112, such as a nut and bolt, or another suitable spacer attachment. The spacer assembly 108 is optional and may be used to provide additional space between the linear bearing 54 and the release element 88. The release element 88 and hinge 90 may be mounted onto the spacer assembly 108 or alternatively, the release element 88 and hinge 90 may be mounted directly onto the exterior surface 62 of the first side 56 of the linear bearing 54. The hinge 90 may be comprised of steel, aluminum, any strong metal or alloy, or another suitable material. In another embodiment of the lock stop apparatus (not shown), the release element does not have a hinge and the hinge is absent. Rather, the release element may be attached directly to the spacer assembly, or alternatively, directly to the exterior surface of the first side of the linear bearing. Depending on the weight of the load being moved, the release element may or may not have a hinge. With heavier loads, the hinge provides additional leverage for the release element. With lighter loads, it is possible to have a straight push, and the release element does not have a hinge. In yet another alternative embodiment, there may be another release element 88 with or without an attached hinge 90 attached to an opposite exterior surface portion 114 on the linear bearing 54 or attached to another spacer assembly 108 such that a double lock is formed. The release element 88 may be comprised of aluminum, steel, any strong metal or alloy, or another suitable material. The release element may comprise a palm paddle, a lever, a push arm, a push button, or another suitable push release element. As shown in FIG. 4, preferably, the release element 88 is a palm paddle 116 that fits in a palm of a human operator's hand. The palm paddle 116 may be drilled for fastening to the hinge 90, spacer assembly 108, or linear bearing 54.

Figure 8:
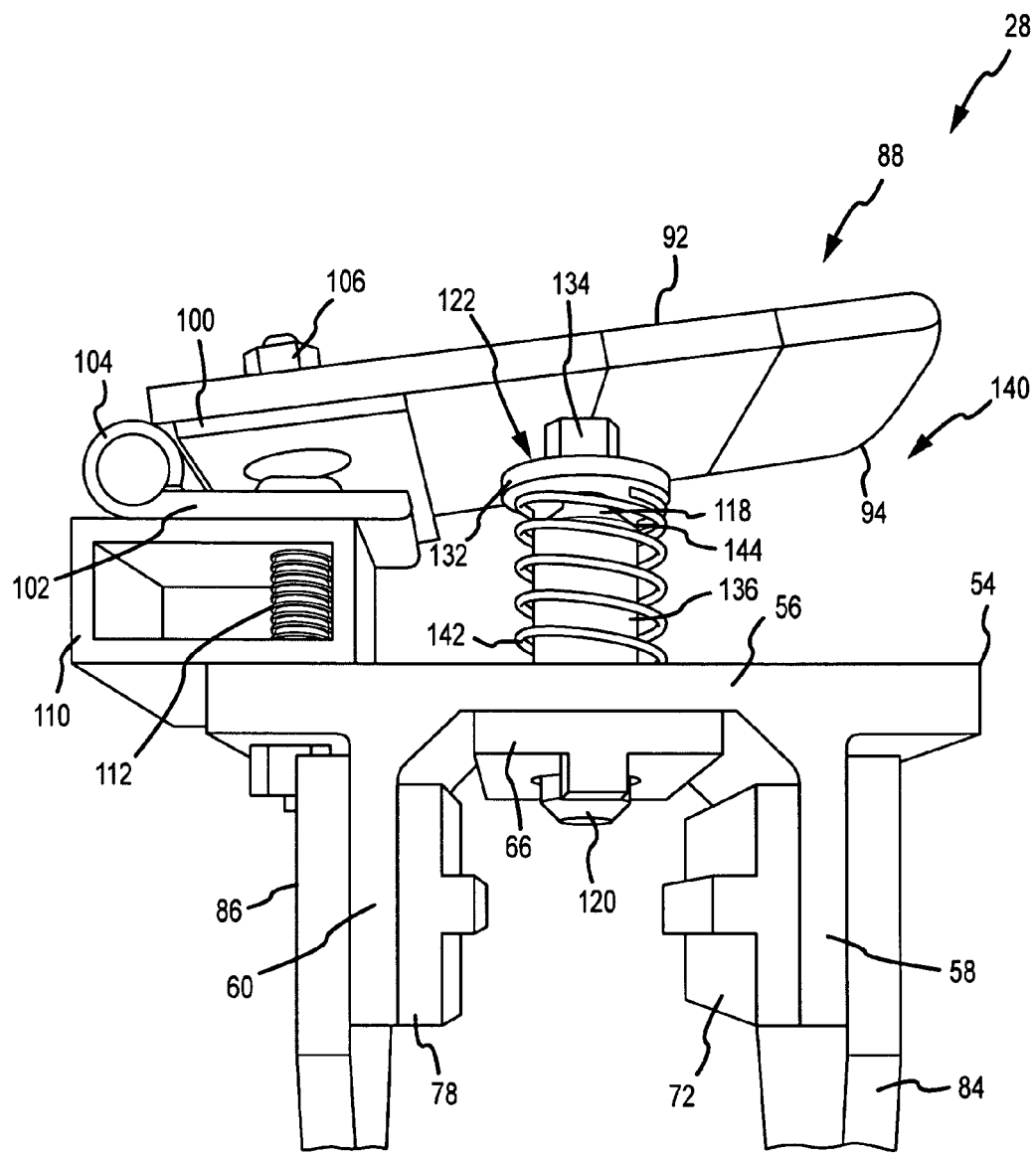
FIG. 8 is an illustration of a back view of the lock stop apparatus of one of the embodiments of the disclosure where the release element is in a released position.
Figure 17:
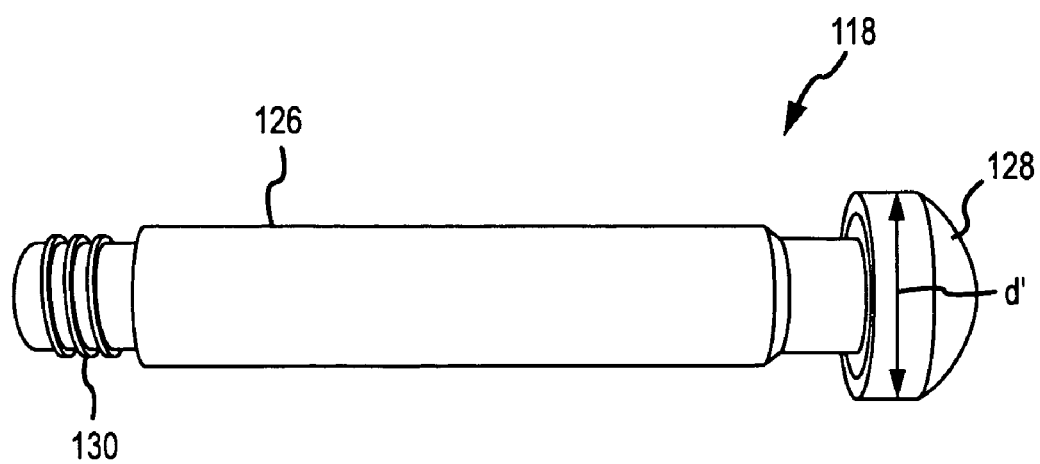
FIG. 17 is an illustration of one of the embodiments of the locking element used with embodiments of the lock stop apparatus of the disclosure.
Figure 19:
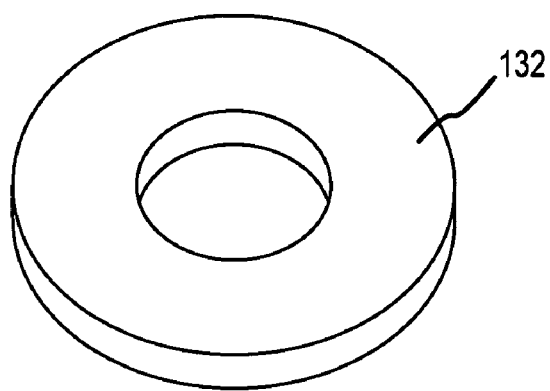
FIG. 19 is an illustration of one of the embodiments of the washer element of the disclosure.
Figure 20:
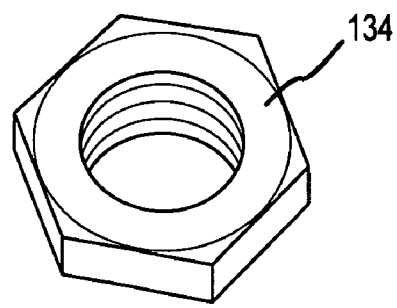
FIG. 20 is an illustration of one of the embodiments of the nut element of the disclosure; and, FIG. 21 is an illustration of a flow diagram of one of the embodiments of the method of the disclosure.

As shown in FIGS. 4 and 8, the lock stop apparatus 28 further comprises a locking element 118 having a first end 120 and a second end 122. The second end 122 may be inserted through the first glide 66 and through the first side 56 of the linear bearing 54 such that the second end 122 is adjacent the release element 88 or palm paddle 116 when the release element 88 or palm paddle 116 is in a depressed position 124 (see FIG. 9). The locking element 118 is preferably attached between the first side 56 of the linear bearing 54 and the second side 94 of the release element 88. FIG. 17 is an illustration of one of the embodiments of the locking element 118 used with embodiments of the lock stop apparatus of the disclosure. As shown in FIG. 17, the locking element 118 preferably comprises a shoulder bolt 126, and the first end 120 of the locking element 118 preferably comprises a head portion 128 of the shoulder bolt 126, and the second end 122 of the locking element 118 preferably comprises a threaded portion 130. The threaded portion 130 may be attached to a washer element 132 (see FIG. 19 and FIG. 8) and a nut element 134 (see FIG. 20 and FIG. 8) to secure the shoulder bolt 126 in place. FIG. 19 is an illustration of one of the embodiments of the washer element 132 the disclosure. FIG. 20 is an illustration of one of the embodiments of the nut element 134 of the disclosure. The locking element may also comprise a suitable bolt or round stock cut to a suitable shape and having a smooth surface that moves in the bushing element 136, or another suitable locking element. The first end 120 of the locking element 118 or the head portion 128 of the shoulder bolt 126 preferably has an outer diameter (d') (see FIG. 9) that is slightly smaller than the outer diameter (d) of each of the spaced openings 36 (see FIG. 15), such that the first end 120 or the head portion 128 can suitably clear and be slip fitted into each of the spaced openings 36. The head portion 128 of the shoulder bolt 126 may be contoured on a lathe or another suitable device so that it slip fits into the spaced openings 36 and the central T-slot portion 44 of the modular extruded part 26.

Figure 18:
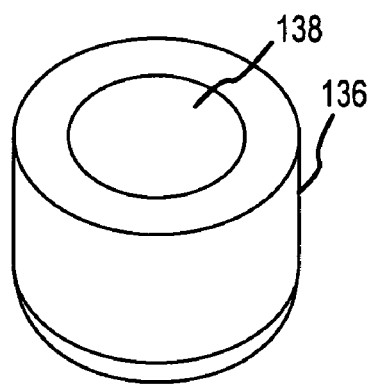
FIG. 18 is an illustration of one of the embodiments of the bushing element used with embodiments of the lock stop apparatus of the disclosure.

As shown in FIGS. 18, 8, and 4, the lock stop apparatus 28 may further comprise a bushing element 136. FIG. 18 is an illustration of one of the embodiments of the bushing element 136 used with embodiments of the lock stop apparatus of the disclosure. The bushing element 136 is preferably made of steel, brass, a strong and durable alloy, or another suitable material. As shown in FIG. 18, the bushing element 136 may have a central opening 138. The bushing element 136 is preferably attached to the exterior surface 62 of the first side 56 of the linear bearing 54. The exterior surface 62 of the first side 56 of the linear bearing 54 may be drilled, and the bushing element 136 may be press fitted into the drilled exterior surface 62 of the first side 56 of the linear bearing 54. The second end 122 of the locking element 118 or shoulder bolt 126 may be inserted through the central opening 138 of the bushing element 136. The locking element 118 or shoulder bolt 126 may move up and down or rotate in the central opening 138 of the bushing element 136.

Figure 9:
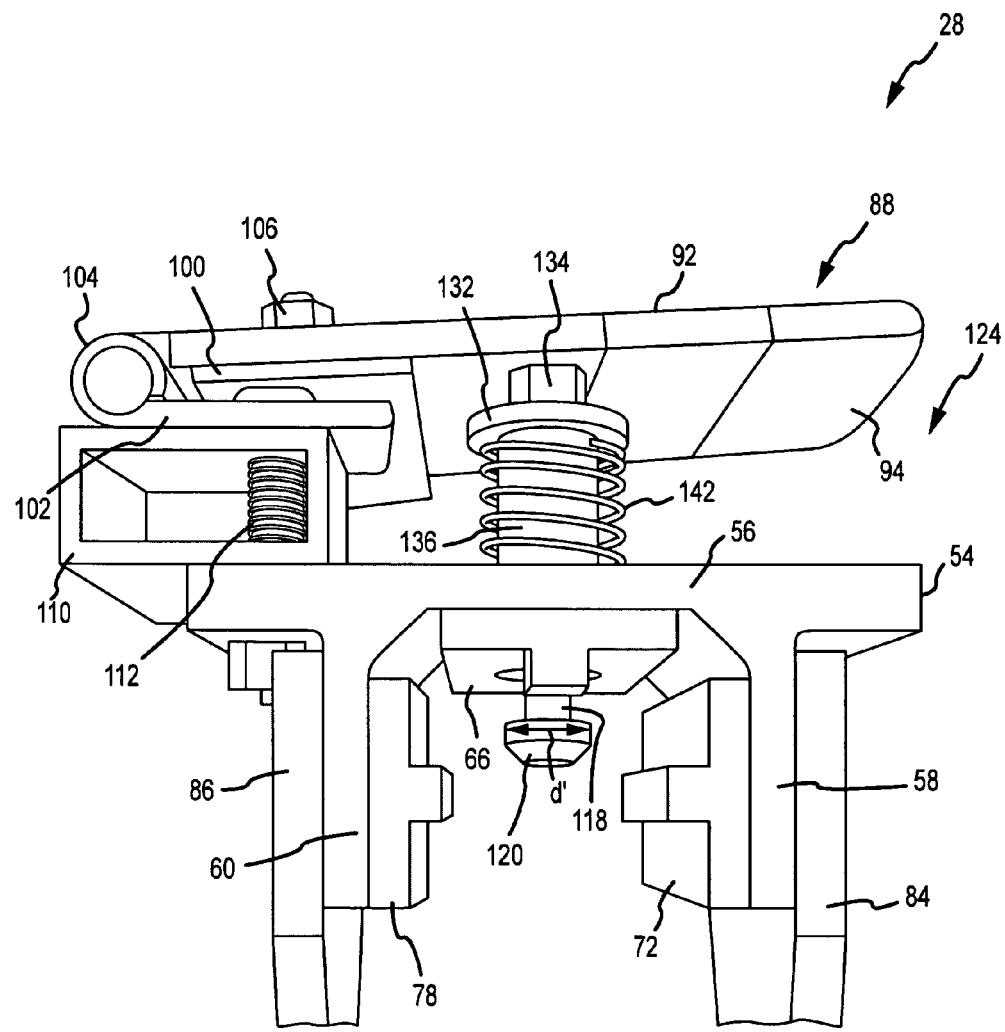
FIG. 9 is an illustration of the lock stop apparatus of FIG. 8 where the release element is in a depressed position.

FIGS. 8 and 9 show the release element 88 or palm paddle 116 in operation. FIG. 8 is an illustration of a back view of the lock stop apparatus 28 of one of the embodiments of the disclosure where the release element 88 is in a released position 140 which is a locked or engaged position. FIG. 9 is an illustration of the lock stop apparatus 28 of FIG. 8 where the release element 88 is in the depressed position 124 which is an unlocked or disengaged position. The release element 88 or palm paddle 116 locks and unlocks the first end 120 of the locking element 118 or shoulder bolt 126 on the modular extruded part 26 or modular T-slot extrusion 34. The release element 88 or palm paddle 116 may be released to engage the first end 120 of the locking element 118 or shoulder bolt 126 with one of the plurality of spaced openings 36 on the modular extruded part 26 or modular T-slot extrusion 34. The release element 88 or palm paddle 116 may be depressed or pushed down to disengage the first end 120 of the locking element 118 or shoulder bolt 126 from one of the plurality of spaced openings 36 on the modular extruded part 26 or modular T-slot extrusion 34. The locking element 118 is typically in a locked position but can be released through the use of the release element 88 or palm paddle 116. An operator (not shown) may release the locking element 118 for normal movement of the lock stop apparatus 28 by means of depressing or pushing down the release element 88 or palm paddle 116. The lock stop apparatus 28 may be engaged at locations that correspond to the spaced openings 36 that occur at periodic or regular intervals 40 on the modular extruded part 26. The lock stop apparatus 28 stops the linear motion of the tool 16 on which it is installed and allows the operator to release the linear bearing 54 for normal movement by means of depressing or pushing down the release element 88 or palm paddle 116 with the palm of the hand of an operator. The release element 88 or palm paddle 116 provides a press to release or a quick release control that locks again when the operator stops pressing. The lock is based on a modification of a linear bearing which is normally in a secured position.

Figure 10:
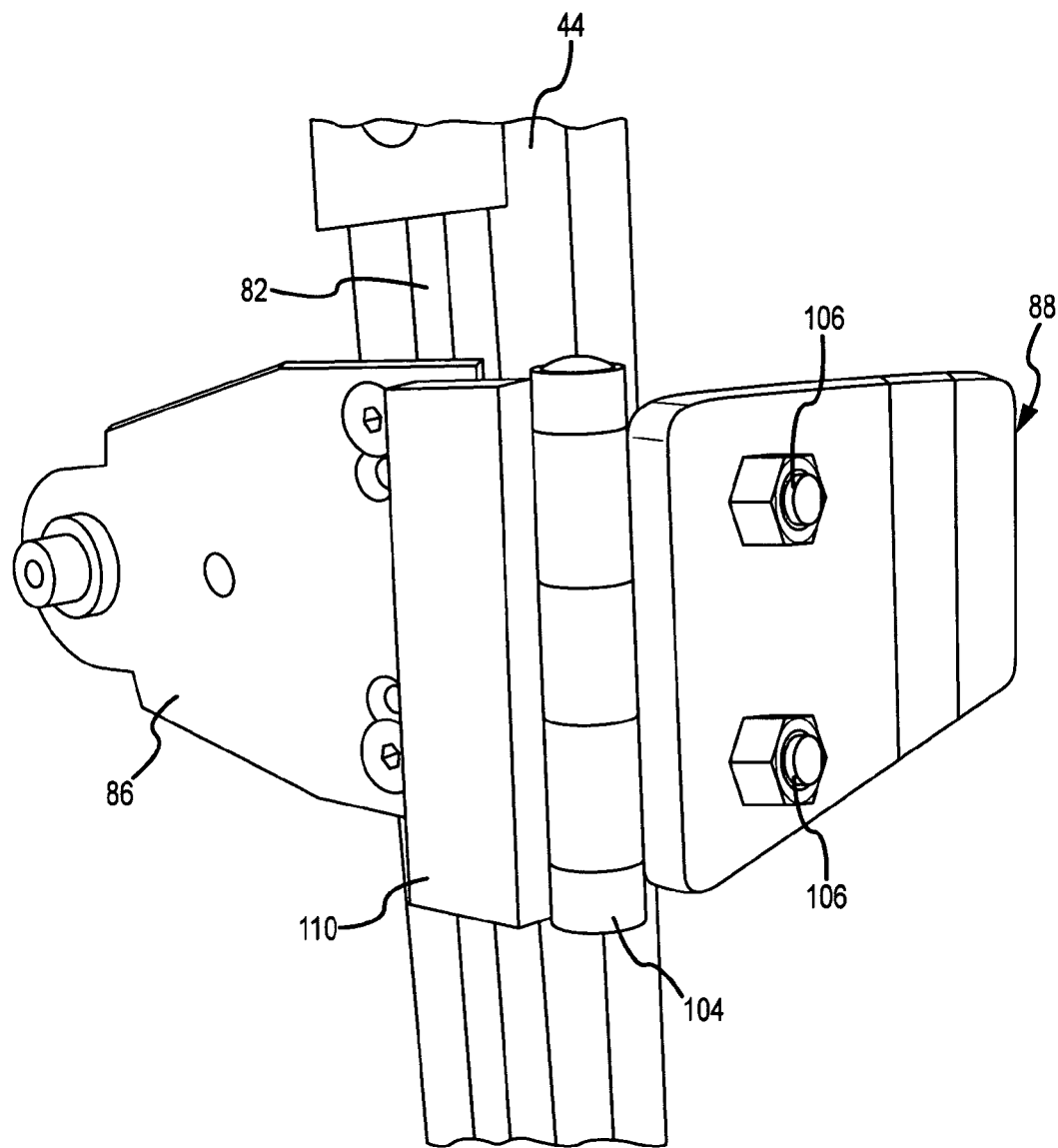
FIG. 10 is an illustration of a close-up left side view of the lock stop apparatus of FIG. 8 attached to a modular extruded part.
Figure 11:
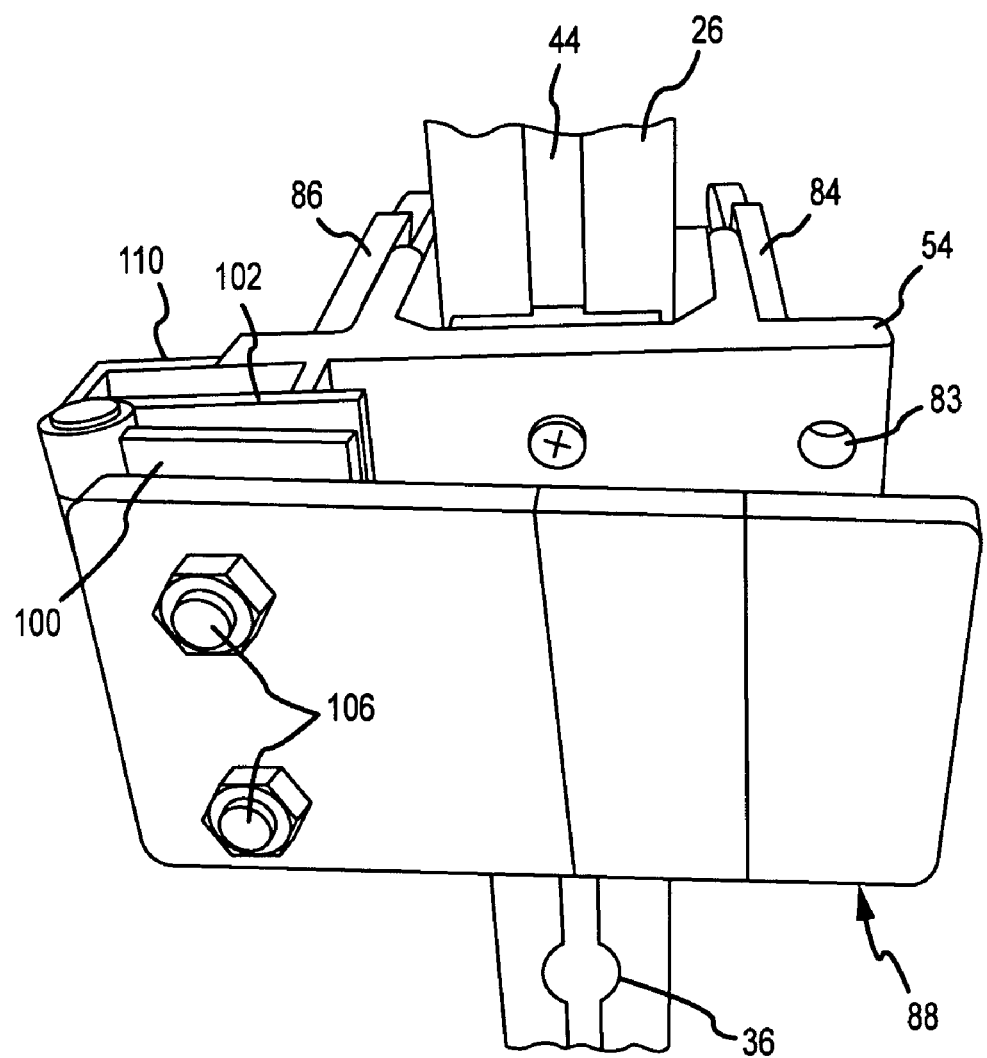
FIG. 11 is an illustration of a close-up top view of the lock stop apparatus of FIG. 8 attached to a modular extruded part showing the release element in a depressed position.
Figure 12:
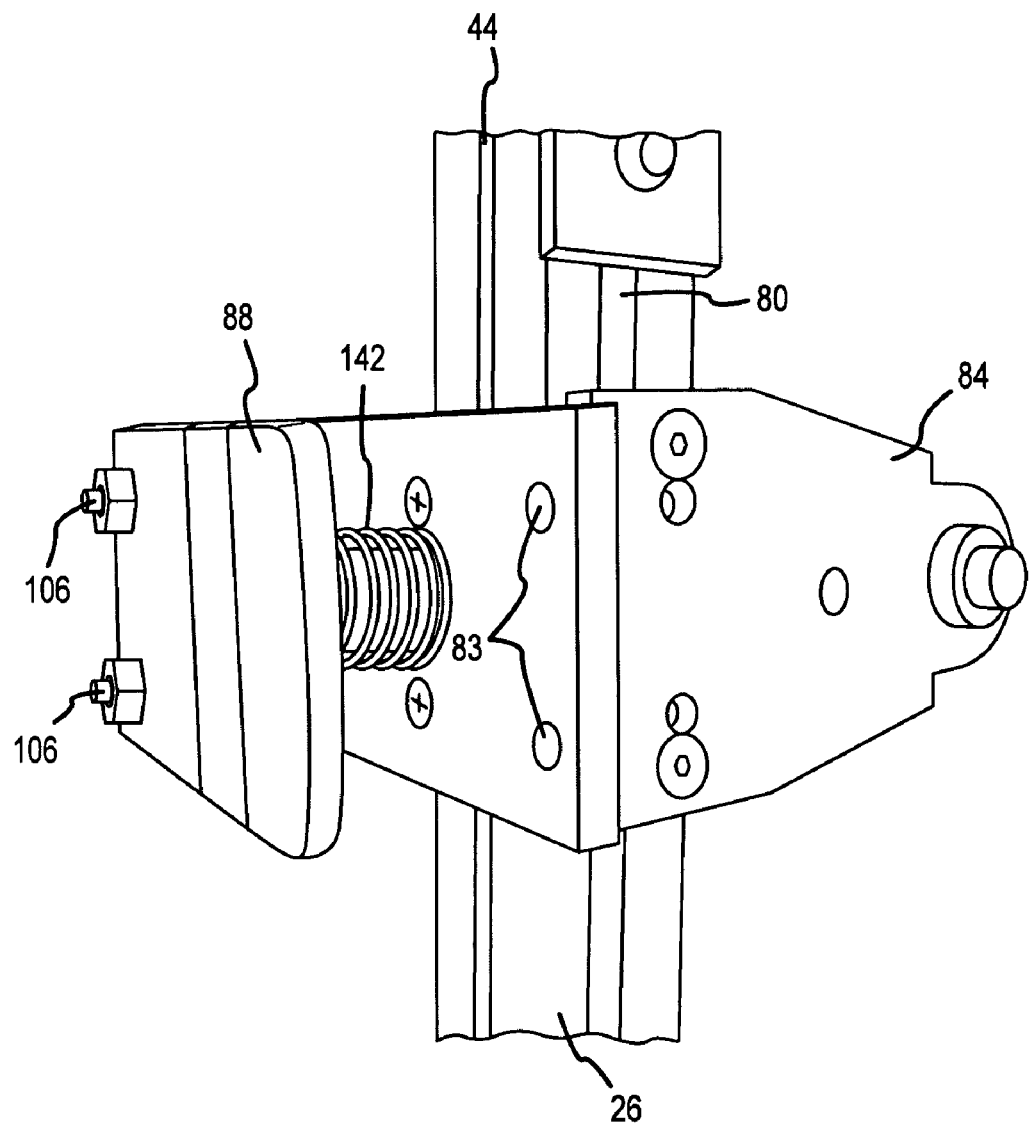
FIG. 12 is an illustration of a close-up right side view of the lock stop apparatus of FIG. 8 attached to a modular extruded part.
Figure 13:
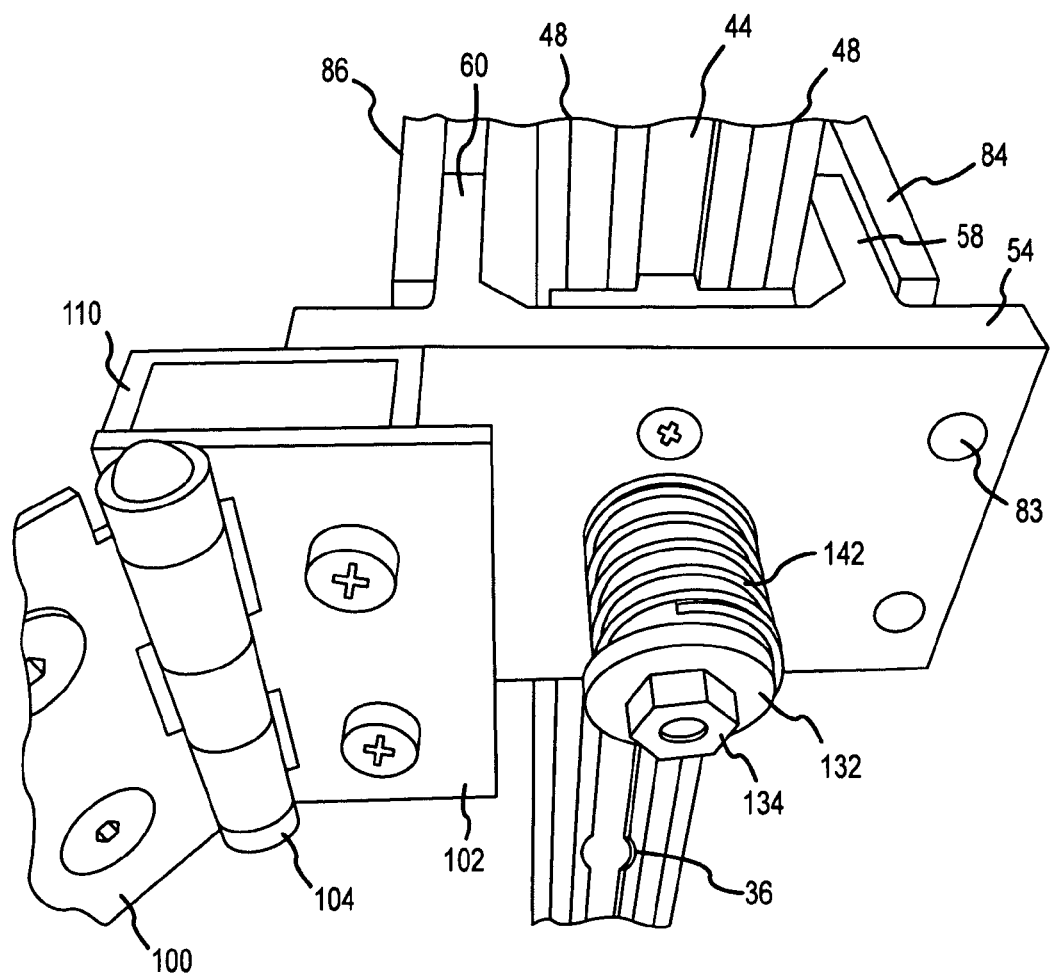
FIG. 13 is an illustration of a close-up top view of the lock stop apparatus of FIG. 8 attached to a modular extruded part showing the release element in a released position.

The operator may release the linear bearing for normal movement by means of depressing the release element 88 or palm paddle 116, providing for controlled movement of heavy, medium, and lighter weight loads. The lock stop system 10 also serves as an emergency brake if an operator loses control. FIG. 10 is an illustration of a close-up left side view of the lock stop apparatus 28 of FIG. 8 attached to the modular extruded part 26. FIG. 11 is an illustration of a close-up top view of the lock stop apparatus 28 of FIG. 8 attached to the modular extruded part 26 showing the release element 88 in the depressed position 124. FIG. 12 is an illustration of a close-up right side view of the lock stop apparatus 28 of FIG. 8 attached to the modular extruded part 26. FIG. 13 is an illustration of a close-up top view of the lock stop apparatus 28 of FIG. 8 attached to the modular extruded part 26 showing the release element 88 in the released position 140.

Figure 16:
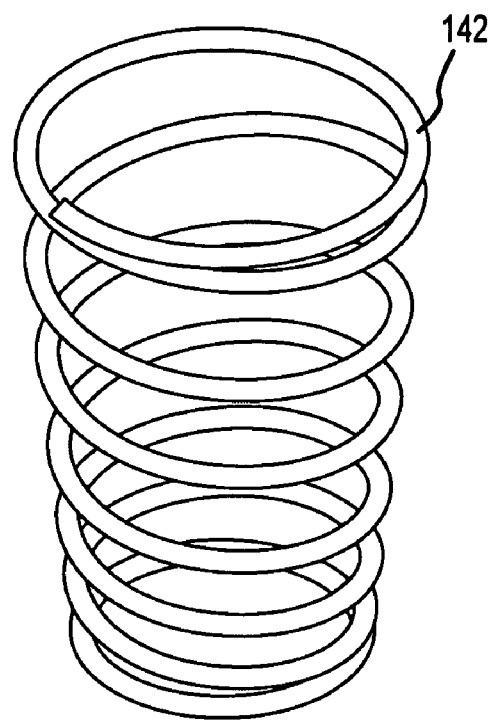
FIG. 16 is an illustration of one of the embodiments of the compression spring used with embodiments of the lock stop apparatus of the disclosure.

As shown in FIGS. 16, 8, and 4, the lock stop apparatus 28 further comprises a compression spring 142 mounted around the bushing element 136 and around at least a portion 144 of the locking element 118. FIG. 16 is an illustration of one of the embodiments of the compression spring 142 used with embodiments of the lock stop apparatus of the disclosure. Preferably, the compression spring 142 is made of steel, stainless steel, chrome plated spring steel, or another suitable material that provides sufficient strength. The lock stop apparatus 28 may further comprise additional hardware such as one or more nut elements 134, one or more washer elements 132, one or more screws or attachment elements, or other suitable hardware for installing or mounting the lock stop apparatus 28 onto the tool 16. When an operator pushes or depresses the release element 88 or palm paddle 116 down onto the second end 122 of the locking element 118, the compression spring 142 is depressed down as well and pushes the first end 120 of the locking element 118 into one of the spaced openings 36 on the modular extruded part 26. The release element 88 or palm paddle 116 acts as the control.

Figure 21:
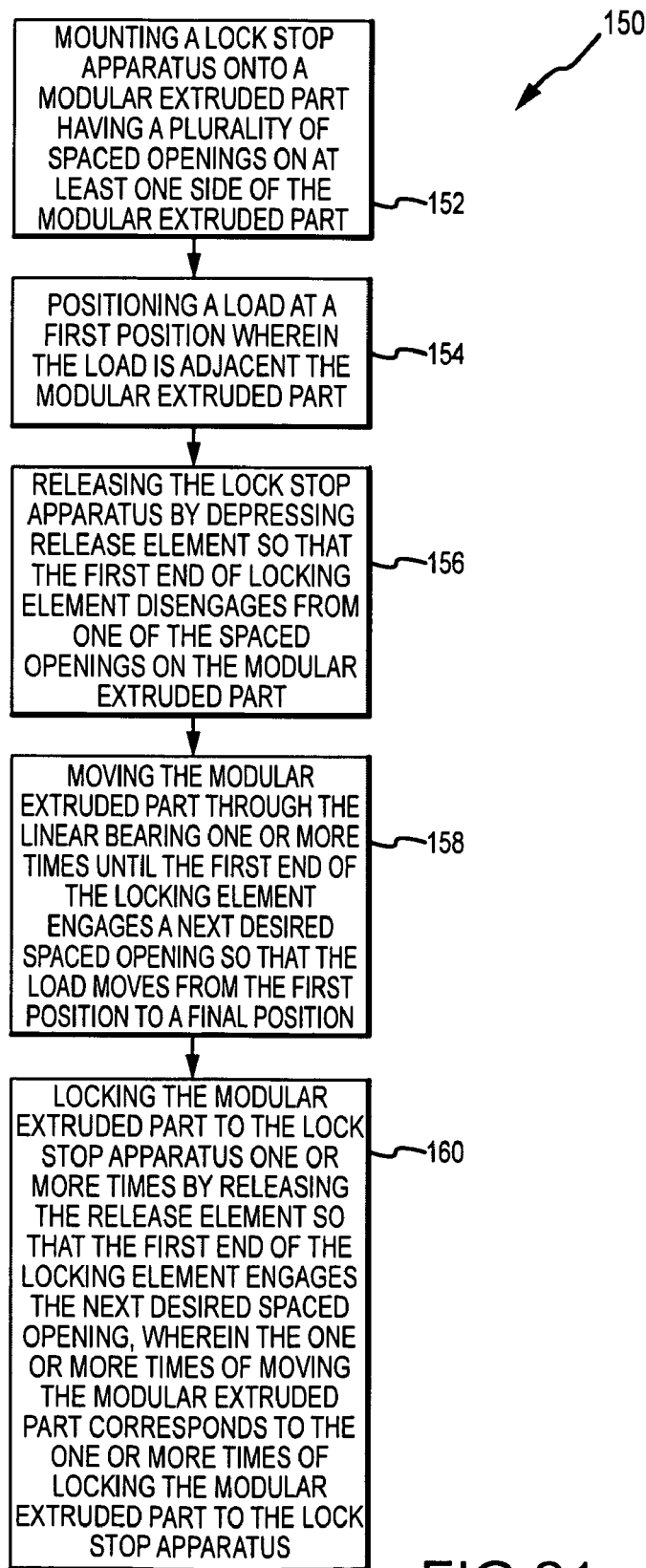

In another embodiment of the disclosure, there is provided a method 150 for locking and controlling movement of a load adjacent a modular extruded part. FIG. 21 is an illustration of a flow diagram of one of the embodiments of the method 150 of the disclosure. The method 150 comprises step 152 of mounting a lock stop apparatus 28 (see FIGS. 4 and 8), as discussed above, onto a modular extruded part 26 having a plurality of spaced openings 36 on at least one side 38 of the modular extruded part 26. The modular extruded part 26 is preferably a modular T-slot extrusion 34. The plurality of spaced openings 36 preferably comprise round openings 42 that are preferably spaced equidistantly from each other at about one inch intervals and machined into the at least one side 38 of the modular extruded part 26. However, the spaced openings 36 may also be spaced non-equidistantly from each other. As discussed above, the lock stop apparatus 28 comprises a linear bearing 54 having at least two sides, and preferably three sides 56, 58, 60. The modular extruded part 26 moves through the linear bearing 54. The lock stop apparatus 28 further comprises a release element 88 having an attached hinge 90. In an alternative embodiment, the hinge is absent. The release element may comprise a palm paddle, a lever, a push arm, a push button, or another suitable element The release element 88 is preferably a palm paddle 116 that fits in a palm of a human operator's hand. The lock stop apparatus 28 further comprises a locking element 118 having a first end 120 and a second end 122. The locking element 118 may comprise a shoulder bolt 126, and the first end 120 of the locking element 118 may comprise a head portion 128 of the shoulder bolt 126, wherein the head portion 128 of the shoulder bolt 126 has an outer diameter (d') that is slightly smaller than an outer diameter (d) of the spaced openings 36, and wherein the head portion 128 can slip fit into each of the spaced openings 36. The lock stop apparatus 28 further comprises a compression spring 142 mounted around at least a portion of the locking element 118. The method 150 further comprises step 154 of positioning a load 16 at a first position 14 (see FIG. 1) where the load 16 is coupled to the modular extruded part 26. The method 150 further comprises step 156 of releasing the lock stop apparatus 28 by depressing the release element 88 so that the first end 120 of the locking element 118 disengages from one of the spaced openings 36 on the modular extruded part 26. The method 150 further comprises step 158 of moving the modular extruded part 26 through the linear bearing 54 one or more times until the first end 120 of the locking element 118 engages a next desired spaced opening 36 so that the load 16 moves from the first position 14 to a final position 52 (see FIG. 3). The method 150 further comprises step 160 of locking the modular extruded part 26 to the lock stop apparatus 28 one or more times by releasing the release element 88 so that the first end 120 of the locking element 118 engages the next desired spaced opening 36, wherein the one or more times of moving the modular extruded part 26 corresponds to the one or more times of locking the modular extruded part 26 to the lock stop apparatus 28.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. A mechanical lock stop system for locking and controlled movement of a load, the system comprising:
   a modular extruded part having a plurality of spaced openings on at least one side of the modular extruded part; and,
   a lock stop apparatus comprising:
      a linear bearing having at least two sides, wherein the modular extruded part moves through the linear bearing;
      a release element having an attached hinge;
      a locking element having a first end and a second end; and,
      a compression spring mounted around at least a portion of the locking element;
   wherein the release element locks and unlocks the first end of the locking element to the modular extruded part.

2. The system of claim 1 further comprising one or more mounting elements attached to the linear bearing.

3. The system of claim 1 further comprising a spacer assembly coupled between the release element and the linear bearing.

4. The system of claim 1 further comprising a bushing element inserted into the first side of the linear bearing, wherein the bushing element has an opening for insertion of the second end of the locking element.

5. The system of claim 1 wherein the plurality of spaced openings are spaced equidistantly from each other at about one inch intervals.

6. The system of claim 1 wherein the plurality of spaced openings comprise round openings machined into the at least one side of the modular extruded part.

7. The system of claim 1 wherein the modular extruded part is a modular T-slot extrusion.

8. The system of claim 1 wherein the release element is selected from the group comprising a palm paddle, a lever, a push arm, and a push button.

9. The system of claim 8 wherein the release element is a palm paddle that fits in a palm of a human operator's hand.

10. The system of claim 1 wherein the locking element comprises a shoulder bolt and the first end of the locking element comprises a head portion of the shoulder bolt, and wherein the head portion of the shoulder bolt slip fits into each of the spaced openings.

11. The system of claim 1 wherein the attached hinge is absent.

12. A mechanical lock stop system for locking and controlled movement of a load positioned on a movable mechanical articulating device, the system comprising:
- a modular T-slot extrusion having a plurality of round equidistantly spaced openings on at least one side of the modular T-slot extrusion; and,
- a lock stop apparatus comprising:
  - a linear bearing having at least two sides, wherein the modular T-slot extrusion moves through the linear bearing;
  - one or more mounting elements attached to the linear bearing;
  - a palm paddle having an attached hinge;
  - a shoulder bolt having a first end and a second end, wherein the first end slip fits into each of the spaced openings;
  - a compression spring mounted around at least a portion of the shoulder bolt;
  - a bushing element inserted into the first side of the linear bearing, wherein the bushing element has an opening for insertion of the second end of the shoulder bolt; and,
  - a spacer assembly coupled between the palm paddle and the linear bearing;
- wherein the palm paddle can be released to engage the first end of the shoulder bolt with one of the plurality of spaced openings on the modular T-slot extrusion, and wherein the palm paddle can be depressed to disengage the first end of the shoulder bolt from one of the plurality of spaced openings on the modular T-slot extrusion.

13. The system of claim 12 wherein the plurality of equidistantly spaced openings are spaced equidistantly from each other at about one inch intervals.

14. The system of claim 12 wherein the attached hinge is absent.

15. A method for locking and controlling movement of a load adjacent a modular extruded part, the method comprising:
mounting a lock stop apparatus onto a modular extruded part having a plurality of spaced openings on at least one side of the modular extruded part, wherein the lock stop apparatus comprises:
- a linear bearing having at least two sides, wherein the modular extruded part moves through the linear bearing;
- a release element having an attached hinge;
- a locking element having a first end and a second end; and,
- a compression spring mounted around at least a portion of the locking element;

positioning a load at a first position wherein the load is adjacent the modular extruded part;

releasing the lock stop apparatus by depressing the release element so that the first end of the locking element disengages from one of the spaced openings on the modular extruded part;

moving the modular extruded part through the linear bearing one or more times until the first end of the locking element engages a next desired spaced opening so that the load moves from the first position to a final position; and, locking the modular extruded part to the lock stop apparatus one or more times by releasing the release element so that the first end of the locking element engages the next desired spaced opening, wherein the one or more times of moving the modular extruded part corresponds to the one or more times of locking the modular extruded part to the lock stop apparatus.

16. The method of claim 15 wherein the plurality of spaced openings comprise round openings spaced equidistantly from each other at about one inch intervals and machined into the at least one side of the modular extruded part.

17. The method of claim 15 wherein the modular extruded part is a modular T-slot extrusion.

18. The method of claim 15 wherein the release element is selected from the group comprising a palm paddle, a lever, a push arm, and a push button.

19. The method of claim 18 wherein the release element is a palm paddle that fits in a palm of a human operator's hand.

20. The method of claim 15 wherein the locking element comprises a shoulder bolt and the first end of the locking element comprises a head portion of the shoulder bolt, and wherein the head portion of the shoulder bolt slip fits into each of the spaced openings.

* * * * *